Figure 1:
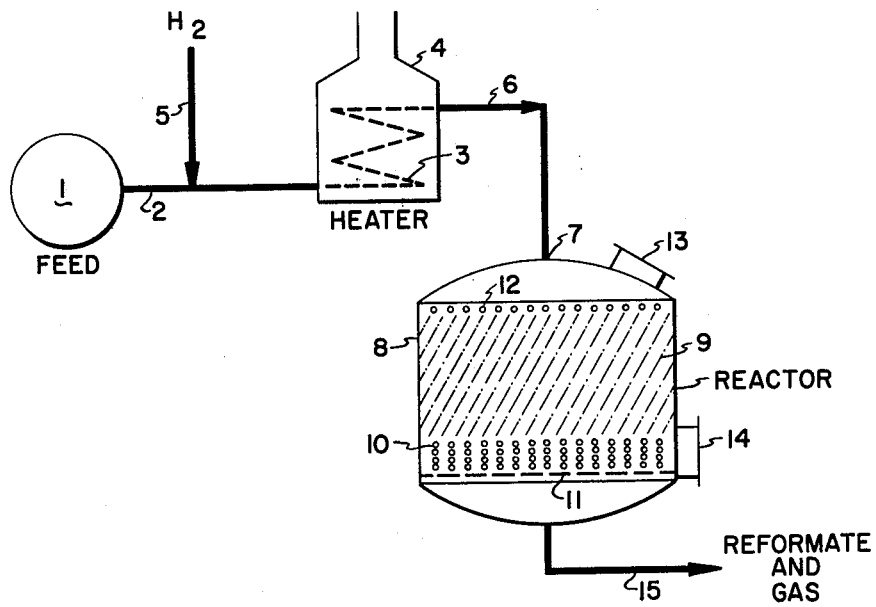

Dec. 4, 1962  L. DAUBER ETAL  3,067,129
HYDROFORMING WITH INCREMENTS OF HIGHLY ACTIVE CATALYST
Filed April 13, 1960

Louis Dauber
Lawrence J. Engel    Inventors

By *Henry Berk*    Patent Attorney

United States Patent Office 3,067,129
Patented Dec. 4, 1962

3,067,129
HYDROFORMING WITH INCREMENTS OF
HIGHLY ACTIVE CATALYST
Louis Dauber, Cranford, and Lawrence J. Engel, Greenbrook Township, Somerset County, N.J., assignors to Esso Research and Engineering Company, a corporation of Delaware
Filed Apr. 13, 1960, Ser. No. 21,972
4 Claims. (Cl. 208—140)

This invention relates to a method of hydroforming naphtha hydrocarbons bypassing them through fixed beds of platinum hydroforming catalyst which are periodically regenerated in situ. More particularly, it is concerned with a procedure of adjusting the space velocity to declining activity of the catalyst aged by repeated regeneration and also making this adjustment dependent upon use of low initial loading of highly active catalyst and periodic, addition of increments of highly active catalyst to the beds of the catalyst as it becomes progressively aged.

General and conventional systems of hydroforming, kinds of feeds, reaction conditions, catalysts, and regeneration treatments to which the present invention applies are described in such patents as U.S. 2,895,905 of Kimberlin, U.S. 2,863,826 of Holcomb et al., U.S. 2,863,822 of Sage, U.S. 2,866,744 of Askey et al., U.S. 2,773,014 of Snuggs et al., and others. Usually, as shown in these patents, the platinum catalyst beds are contained in a series of several reaction vessels operated adiabatically by use of preheaters and intermediate reheaters of the reactant stream. Periodically, catalyst beds are regenerated by burning of carbonaceous deposits using oxygen-containing gas or, also, mixtures of such gas with halogen or halide.

There have been many variables in continuous or semicontinuous regenerative hydroforming processes to be controlled for obtaining uniform yields of products and uniform quality of products. A great amount of difficulty in controlling the variables has now been found to come from the use of fixed amounts of catalyst in the reaction vessels and from wide variations in the temperature in successive cycles.

If the total amount of catalyst in the reactors is initially fixed for a definite octane level when the catalyst is aged from repeated regenerations, there initially is an excessive amount of highly active fresh catalyst present. This dictates the use of low reactor temperatures at the beginning in order to prevent "overshooting" the required octane number and to prevent excessive coke formation. In later cycles, with all the catalyst held constant in amount and becoming aged, increases of temperature are required. The adjustment of the temperature to the loss of catalyst activity is difficult, and wide temperature variations are highly adverse to the yield of gasoline product. They make the yield loss particularly severe when using the otherwise more economical low platinum content catalyst, e.g., 0.3 wt. percent platinum on alumina.

In accordance with the present invention, starting with a low inventory of fresh catalyst which permits a space velocity to be used at a maximum reactor temperature, the catalyst inventory is increased by added fresh catalyst at suitable periods and in suitable proportions to permit the maximum temperature to be maintained at a reasonably constant level at all times, or at least over a large number of cycles. The maximum temperature is that at which the best yield is obtained of a desired product without excessive catalyst deterioration.

A study of the patterns of catalyst aging, i.e., loss of intrinsic catalyst activity from repeated regenerations, has shown there are particularly suitable periods at which to add fresh catalyst in suitable amounts.

A preferred method of operation under the present invention is carried out with the following steps:

(a) Charge only about half (40 to 60%) as much fresh catalyst to the reactors as will be needed ultimately, i.e., at the end of the catalyst life.

(b) Use high space velocities and high reaction temperatures at the start and through a number of cycles. By high space velocities is meant about 50 to 100% higher than space velocities used at the end of the catalyst life.

(c) Compensate for the loss of intrinsic activity by adding fresh catalyst as the intrinsic activity of the catalyst declines due to aging.

(d) Maintain a high reaction temperature level and lower the space velocity in proportion to the increased catalyst inventory.

The foregoing mode of operation will provide for high temperature-high space velocity operation over a large part of the useful life of the catalyst.

The following advantages have been seen to accrue from the operation of this invention:

Improved yields of reformate.
Better use of low platinum catalyst.
Higher $C_5+$ selectivity, with less coke formation, less frequent regeneration, and longer catalyst life.

Since the reactor series operations are well known and since the present invention has been shown to be of benefit not only in the use of a series of reactors but in use of a single reactor, for the sake of simplicity, details with respect to equipment and means for carrying out the invention will be described with reference to a single reactor vessel.

In FIG. 1 of the drawing is illustrated schematically a single reactor vessel and appurtenances.

Figure 2:
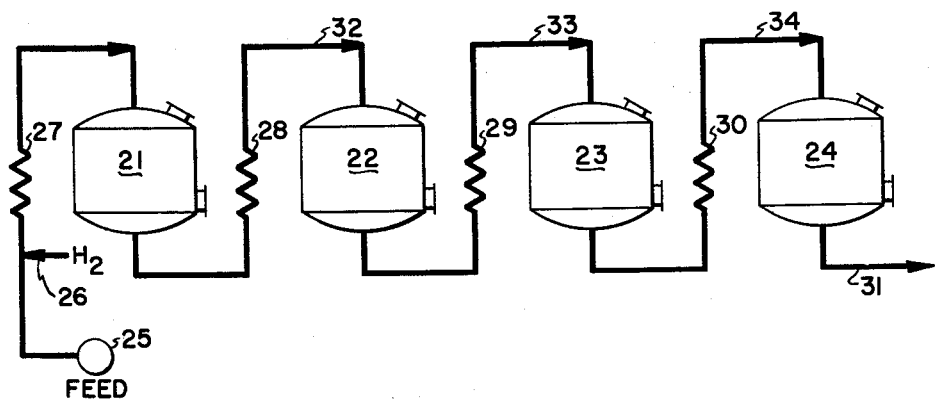

In FIG. 2 is illustrated a typical flow plan for a series of reactor vessels.

Referring to FIG. 1 of the drawing, a hydrocarbon naphtha fraction from a source 1 is passed by line 2 into the inlet of a heating coil 3 in furnace 4. Fresh hydrogen gas and/or hydrogen-rich recycle gas is added from line 5 to the hydrocarbon feed stream that is preheated to a desired temperature, e.g., in the range of 850° to 1000° F., when it leaves the heating coil 3 to be passed by line 6 to the feed inlet 7 of the reaction vessel 8.

The reactor or reaction vessel 8 of suitable metal, e.g., stainless steel, contains the bed 9 of platinum-alumina catalyst in the form of granules, pellets, or pills. Since this catalyst bed is to only partly fill the vessel 8, it is supported on a mass of ceramic balls or pellets 10 above a grid 11 so that too much vapor space is not given above the catalyst, since in such vapor space the entering hydrocarbon vapors will undergo thermal cracking which is undesirable. Ceramic pebbles or a ceramic grid 12 may be placed above the catalyst bed 9 for aiding distribution of the gas-vapor mixture into the catalyst bed.

Usually the catalyst particles, e.g., pellets or pills, are about $\frac{1}{32}$ to $\frac{1}{4}$ inch in thickness. The ceramic balls may be larger, e.g., about $\frac{1}{2}$ to 1 inch in diameter.

Manholes 13 and 14 with removable covers are located at places in the vessel 8 for access to the interior of the vessel so as to permit addition of catalyst and removal of ceramic balls. On deepening the catalyst bed 9 by addition of fresh catalyst, a corresponding volume of ceramic balls acting as a support for the catalyst bed may be removed. Alternatively, means may be employed for adjusting the level of the supporting grid 11.

The products stream of reformate and gas leaving the catalyst bed is withdrawn from the reactor 8 by line 15 for recovery or to be sent to the next of a series of reactors employed in a similar manner.

FIG. 2 shows how several reactors, 21, 22, 23 and 24, are connected in series so that the feed from source 25 and H$_2$-containing gas from line 26 forms a stream which passes through an initial preheater 27 into reactor 21 and the reaction mixture of hydrocarbons and gas then passes to the succeeding reactors.

Between the reactors the reaction mixture stream may be made to pass through interheaters 28, 29, and 30 to make the reactors operate adiabatically with desired reaction temperatures. The final reformate product and gas leaves the last reactor 24 through line 31 for recovery of reformate product and recycle gas. Interconnecting lines for the stream are 32, 33 and 34.

The general reforming conditions are tabulated as follows:

TABLE 1
*Process Variable Ranges*

| | |
|---|---|
| Pressure, p.s.i.g. | 200–650 |
| Reactor temperature, °F. at inlet | 850–1000 |
| Recycle gas rate, s.c.f./b. | 2000–15000 |
| Catalyst requirement (w./hr./w.), space velocity of liquid feed (lbs. feed/hour/lb. catalyst) | 0.5–4.0 |
| Catalyst, Pt content on alumina, wt. percent | 0.1–1.0 |

The yields of C$_5$+ reformate having a certain octane number change within a cycle (between regenerations) and may change after each regeneration, hence, the effects of the process variables have to be considered with regard to initial yields, yields at various cycles, and yield maintenance.

Studies were carried out on hydroforming 160/260° F. naphtha to 100 octane number reformate using a fresh 0.3% Pt on alumina catalyst under 300 p.s.i.g. These studies showed that the reaction was best carried out at high temperatures and high space velocity, particularly from the standpoint of gasoline and hydrogen yields, as shown in the following table:

TABLE 2
*Fresh Catalyst—Higher Temperature—Higher Space Velocity*

| Temp., °F. | W./hr./w. | Yield, Vol. Percent Fresh Feed 100 RON C$_5$+ Reformate | H$_2$, Wt. Percent, Fresh Feed |
|---|---|---|---|
| 925 | 1.5 | 58 | 1.5 |
| 900 | .7 | 52 | 1.0 |

The foregoing data is typical even of effects obtained in an isothermal unit, and appear to show that in using a fresh catalyst with lower temperature and lower feed rate, there is more destruction of paraffins and cyclic hydrocarbons, particularly aromatics. These results were then found to indicate the desirability of drastically lowering the fresh catalyst inventory requirement at startup.

As the catalyst ages with repeated regenerations, it undergoes changes in surface area, pore distribution, acidity, etc., such as to give the catalyst a lower intrinsic activity. These changes are referred to as aging or heat aging. However, a very interesting observation was made that the yields could be made surprisingly high with the heat aged catalyst at a low space velocity without excessive increase in temperature in comparison to yields with a fresh catalyst at the same low space velocity. Since the temperature in using the heat aged catalyst was only up to approximately the same level as shown best for the fresh catalyst with higher space velocity, the improvement could not be accredited only to the temperature effect.

The following comparison was obtained with the same kind of feed and catalyst employed for the results of the previous Table 2.

TABLE 3
*Heat Aged Catalyst—Good Selectivity at Low Space Velocity*

| Catalyst State | W./hr./w. | Temp., °F. | C$_5$+ Reformate Yield, Vol. Percent Fresh Feed |
|---|---|---|---|
| Fresh | 0.7 | 900 | 52 |
| Aged | 0.7 | 925 | 60 |

There was still another question to be answered, and that was how to obtain improvement over conventional design operation in between the high initial activity and the final low intrinsic activity aged catalyst stages. The present invention in its method of adding fresh catalyst gives an opportune answer, particularly as it takes into account changing aging rates and corrections thereof to maintain the reaction temperature close to constant, i.e., at about the same level on starting each new cycle.

The following examples illustrate the method of starting with a partial catalyst inventory when the catalyst is fresh, i.e., has its highest intrinsic activity, then compensating for aging by adding fresh catalyst at intervals. A semi-regenerative series of four adiabatic reactors is designed to hold 100,000 lbs. of catalyst in hydroforming a typical feed, e.g., desulfurized Arabian naphtha (highly paraffinic) and of 160/260° F. boiling range. With all the catalyst charged, the space velocity at the design rate is 0.7 w./hr./w. to maintain yields of 100 octane number C$_5$+ reformate. In this designed operation, the initial maximum temperature is 900° F. The designed operation requires regeneration of the total catalyst charge every two months and the yields start at 50 vol. percent.

Now modifying the procedure in accordance with the present invention, i.e., by charging only about half of the design catalyst loading to each reactor, starting with a higher reaction temperature and higher space velocity, and adding fresh catalyst at intervals between cycles to permit use of high space velocities and high reaction temperatures during many of the cycles, the yield credits over conventionally designed operation obtained are shown in the following table:

TABLE 4
*Comparison of Conventional Designed Operation With Modified Operation (Altering Catalyst Loading)*

Conditions: 0.3% Pt on alumina catalyst
A/A$_0$ is the activity of the catalyst in any given cycle relative to that of the catalyst in the initial cycle

| Time, Months | Cycle | A/A$_0$ | Percent Design Cat. Loading | C$_5$+ Yield Credit Per Cycle, Vol. Percent Fresh Feed | Actual, w./hr./w. |
|---|---|---|---|---|---|
| 0 | 1 | 1.0 | 53 | 9 | 1.32 |
| 2 | 2 | | | | |
| 4 | 3 | .87 | 61 | 5 | 1.15 |
| 6 | 4 | .80 | 66 | 3 | 1.06 |
| 8 | 5 | .76 | 69 | 2 | 1.00 |
| 10 | 6 | .72 | 73 | 1 | .95 |
| 12 | 7 | .70 | 76 | 1.1 | .92 |
| 22 | 12 | .62 | 86 | 0.3 | .90 |
| 24 | 13 | .61 | 86 | 0.3 | .80 |
| 34 | 18 | .57 | 92 | 0.2 | .75 |
| 36 | 19 | .56 | 93 | 0.2 | .75 |
| 48 | 25 | .53 | 99 | 0.1 | .70 |

The foregoing data illustrates that most of the benefit from starting with an initial partial loading of the reactors with fresh catalyst and periodic addition of fresh catalyst is obtained in the early cycles with respect to yield credit. The fresh catalyst or higher activity catalyst can be added in smaller amounts and at less frequent intervals as the catalyst aging advances. Yield credit is the yield increase expressed as liquid volume percent on fresh feed obtained by the operation of the present invention compared to a fixed catalyst inventory operation.

The relative catalyst activity shown for each cycle is based upon the total number of regenerations starting with the first cycle. However, by the latter catalyst additions, the resulting bed of catalyst experiences fewer regenerations and thus the catalyst in total experiences less aging. The $A/A_0$ values in the table are conservatively based on the conventional design operation in which all the catalyst is charged in the first cycle. By the modified method of adding fresh catalyst at later cycles, the effective life of the catalyst can be extended by about 20 to 50%.

Further, as shown in Table 4, the catalyst bed size or amount of catalyst is best increased in the early cycles, e.g., increased about 50% after about one-fourth of the life of the initial catalyst loading has expired, and increased about 70% after about one-half of the life of the initial catalyst loading has expired.

The present modified type of operation has the further merit of permitting the use of a practically constant high temperature from cycle to cycle in the reaction zones throughout the catalyst life with stepwise decrease from an initial high space velocity which is responsive to the stepwise increase in catalyst loading which makes an additional yield credit of the $C_5+$ reformate, and accordingly the cumulative yield credit is even higher than is shown in the table as credit per cycle.

The method of using a low initial fresh catalyst charge with subsequent additions of fresh catalyst after regeneration and between cycles can be employed in a hydroforming system in which the reactors are used in series, and a shift reactor replaces any reactor switched into regeneration. This kind of operation involves regeneration of one reactor out of five every eight days, the lead reactors being regenerated less frequently than the tail reactors. For this kind of system, the initial loading of all the reactors can be about 40 to 60% of design (final loading).

A further advantage of adjusting the space velocity to catalyst inventory with increments of higher activity catalyst is in the smoother operation with simpler controls, because the feed rate and the temperature to which the feed is heated can be kept at approximately the same level for all cycles. For example, with the feed rate set and the heating set for a certain temperature level in starting the initial cycles the same feed rate and intensity of heating can be used in starting the final cycles. In other words, these settings are repeated for the repeated cycles.

The invention described is claimed as follows:

1. In a regenerative catalytic process for reforming a hydrocarbon naphtha fraction in which a vaporous naphtha feed and hydrogen-containing gas are passed through a bed of platinum-alumina catalyst which is periodically regenerated by burning off carbonaceous deposits and thereby becomes aged to lower intrinsic activity, the improvement which comprises initially charging only about one half as much fresh catalyst to the reactors as will be ultimately needed at the end of the catalyst life maintaining the catalyst bed at reforming pressures and at substantially maximum temperature, passing the vaporous feed stock through the catalyst bed at a space velocity about 50 to 100% higher than the space velocities used at the end of the catalyst life, periodically regenerating the catalyst by burning off carbonaceous deposits, compensating for the loss of activity by adding fresh catalyst as the intrinsic activity of the catalyst in the reactor declines, maintaining the said maximum temperature at a substantially constant level over a large number of cycles and lowering the space velocity of the feed in proportion to the increased catalyst inventory in the reactors.

2. The process as defined in claim 1 wherein the catalyst contains about 0.3 wt. percent platinum supported on alumina.

3. In a process defined by claim 1, said catalyst bed being increased in size by about 50% through the adding of catalyst after about one-fourth of the life of catalyst initially used has expired.

4. In a process defined by claim 1, said catalyst bed in an initial cycle being about half compared to the final quantity of catalyst in the bed when the life of the initial cycle catalyst is expired, and said catalyst bed being increased in amount with added catalyst by about 70% after about one-half the life of the catalyst initially used has expired.

References Cited in the file of this patent

UNITED STATES PATENTS

| | | |
|---|---|---|
| 2,450,804 | Loy | Oct. 5, 1948 |
| 2,760,913 | Vander Ploeg | Aug. 28, 1956 |
| 2,780,603 | Burton | Feb. 5, 1957 |